May 8, 1956  J. G. KAY ET AL  2,744,612

ORIENTER

Filed Feb. 28, 1955  2 Sheets-Sheet 1

INVENTORS
John G. Kay
John K. Frye
BY

May 8, 1956  J. G. KAY ET AL  2,744,612
ORIENTER
Filed Feb. 28, 1955  2 Sheets-Sheet 2

INVENTORS
John G. Kay
John K. Rye
BY

United States Patent Office 2,744,612
Patented May 8, 1956

2,744,612

ORIENTER

John G. Kay, Detroit, and John K. Rye, Southfield Township, Oakland County, Mich., assignors, by mesne assignments, to F. Joseph Lamb Company, Detroit, Mich., a corporation of Michigan Application February 28, 1955, Serial No. 490,974

8 Claims. (Cl. 198—33)

This invention relates to improvements in orienters and means for automatically controlling the feed of workpieces thereonto. At the present time most orienters are designed to have a large quantity of workpieces thereon during their operation, and they are tumbled and churned one against another during their orientation. However there are many workpieces which must be held to close tolerances and require more careful handling to prevent marring and deformation which would render them unacceptable for the purpose for which they are intended.

It is, therefore, an object of the invention to provide a specially constructed orienter for fast orientation of a relatively small number of workpieces at a time, and means actuated by oriented pieces prior to their discharge from the device for controlling the delivery of other workpieces thereonto.

Another object of the invention is to provide an orienter including a rotary cone onto which workpieces are deposited a few at a time; wherein the inclination of the cone is such that workpieces tend to become oriented as they slide down the cone toward its base; and wherein an annular shelf mounted around the cone is rotatable about an axis inclined to that of the latter, so that one portion of the cone is always higher than an adjacent portion of the shelf so that workpieces slide from the former onto the latter, and another portion of the cone is always lower than a portion of the shelf adjacent thereto so that unoriented workpieces on the shelf may be readily returned onto the cone.

A further object of the invention is to provide such an orienter including control means actuated by oriented workpieces travelling upon the shelf toward a point of discharge for preventing the delivery of more workpieces onto the cone until those already thereon have traveled past the control means; and to so construct the orienter that the time lag between the operation of the control means to deliver more workpieces onto the cone and their arrival upon the shelf is very slight.

Having thus broadly stated some of the objects and advantages of the invention I will now describe it in detail with the aid of the accompanying drawing, in which.

Figure 2:
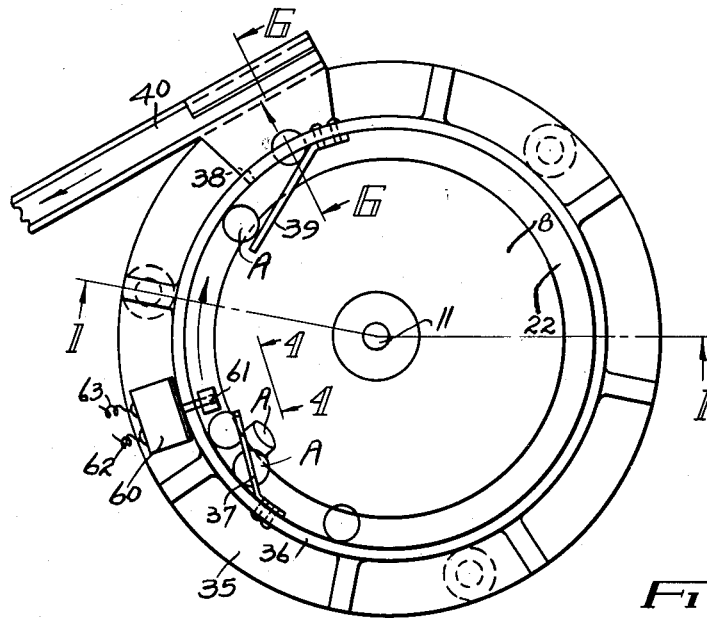
Figure 2 is a plan view of the orienter taken on the line 2—2 of Figure 1.

Referring to the drawings, 1 designates a stand on which a circular base 2 is mounted. Formed integral with and centrally of the base 2 is a vertical bearing 3 to support the lower extremity of a stationary shaft 4 which is secured therein as by a screw 5. Mounted around the shaft 4 are spaced bushings 6 to support a tubular stem 7 integral and coaxial with a cone 8 having a depending annular skirt 9. Formed in the upper face of the cone 8 is a coaxial recess 10 to receive a circular insert 11 the upper face of which is substantially conical, and secured on the upper face of the shaft 4 and extending over the base of the recess 10 is a washer 12 which is held in position by a screw 13. Secured to the lower annular face of the stem 7 as by screws 14 one of which is shown, is a bevel gear 15.

Extending horizontally through spaced bearings 16 provided in the base 2 is a shaft 17 having a bevel pinion 18 on its inner extremity which meshes with the gear 15, and provided on the outer extremity of the shaft 17 are suitable means for turning the latter, which, in the present instance consist of a sprocket 19 driven by means not shown through an endless chain indicated at 20.

Figure 1:
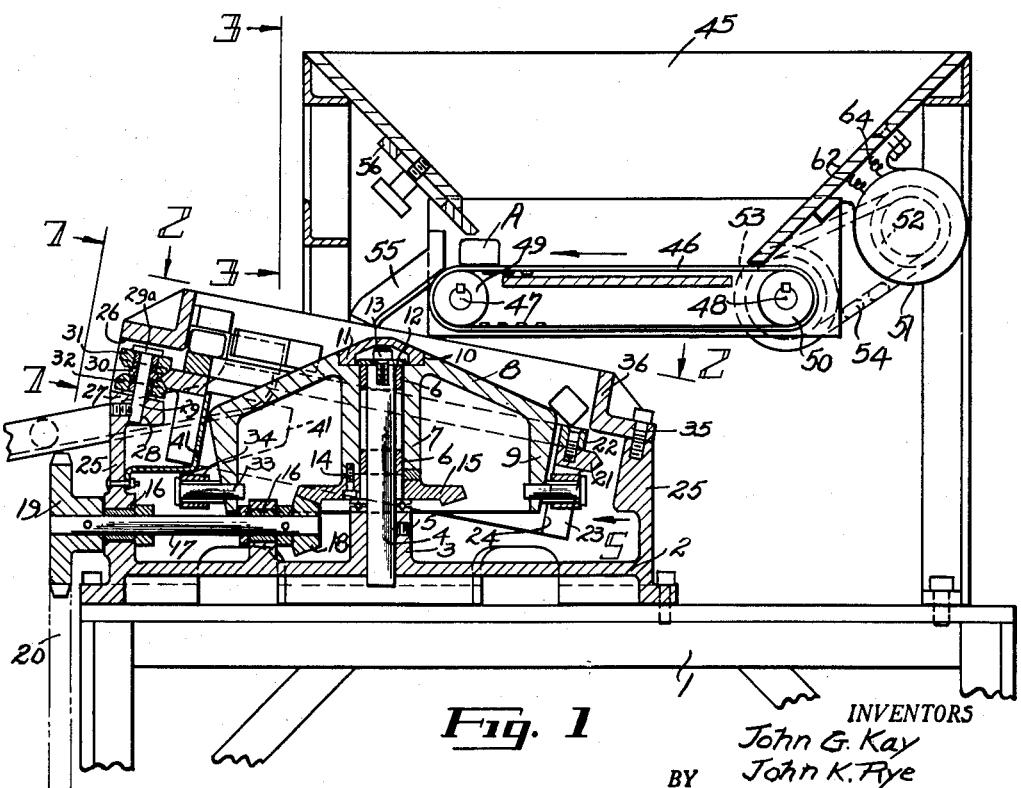
Figure 1 is sectional view of the orienter taken on the line 1—1 of Figure 2, and also showing the feed hopper in section.
Figure 3:
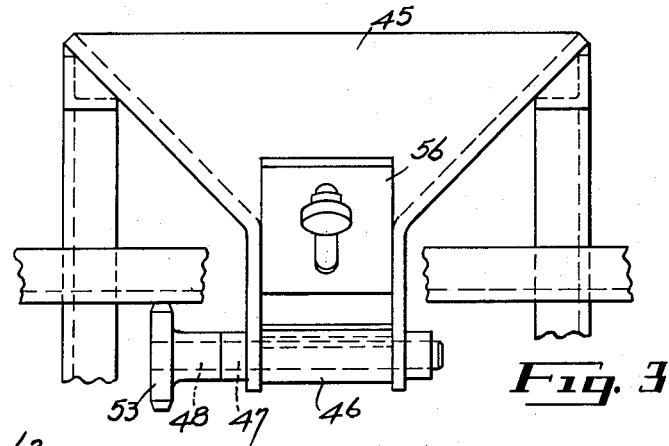
Figure 3 is a somewhat enlarged view of the hopper taken on the line 3—3 of Figure 1.
Figure 4:
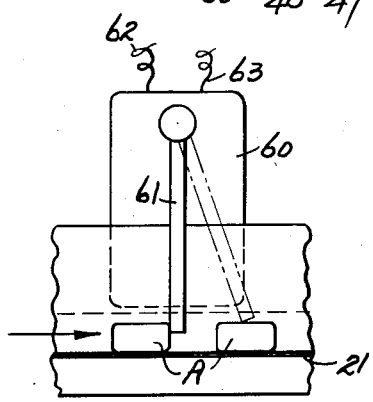
Figure 4 is an enlarged view on the line 4—4 of Figure 2.
Figure 5:
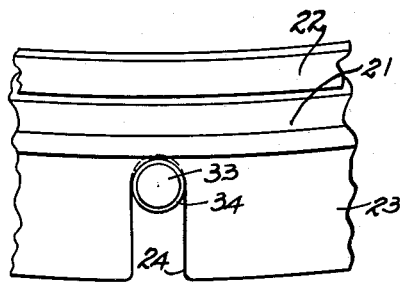
Figure 5 is an enlarged view showing a portion of the annular member and one of the slots therein, taken in the direction of the arrow 5 of Figure 1.
Figure 6:
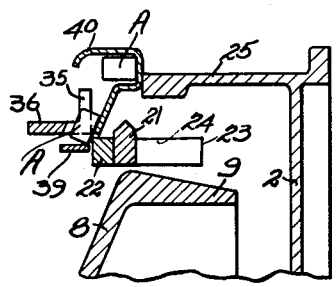
Figure 6 is a section on the line 6—6 of Figure 2.
Figure 7:
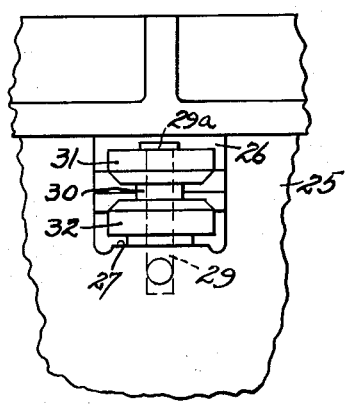
Figure 7 is an enlarged view on the line 7—7 of Figure 1.

Mounted in a manner hereinafter described for rotation about an axis inclined, usually at about 10 to 15 degrees, to the vertical axis of the cone 8 is a ring 21 having its outer periphery substantially V-shaped in cross section. Secured upon the upper face of the ring 21 is an annular shelf 22, and depending from and integral with the ring 21 is an annular member 23 having spaced, open-ended slots 24 formed in its underside. Formed integral with the base 2 is a circular wall 25 having circularly spaced apertures 26 formed therethrough intermediately of its height, one of which is shown in Figure 1. Forming the lower side of each aperture 26 is an inwardly projecting flange 27 the upper face of which is inclined at right angles to the axis of the ring 21, and formed through each flange 27 is an opening 28, the axis of which is parallel with the axis of the ring, in which the lower extremity of a pin 29 is suitably secured. Mounted upon each pin 29 between its head 29a and the flange 27 and held apart by a spacer 30 are two rollers 31 and 32, the adjacent peripheral portions of which are inwardly inclined toward the spacer to form a substantially V-shaped groove between them to receive and support the outer periphery of the ring 21 for rotation.

Mounted upon the annular skirt 9 of the cone 8 are outwardly projecting drive pins 33 having sleeves 34 thereon which are radial to the axis of the cone. These drive pins are each positioned to engage one of the slots 24 in the annular member 23 and impart rotation to the ring 21 when the cone is turned. Since the axes of the ring 21 and cone 8 are inclined to one another and since the axis of the cone is vertical, the underside of the annular member 23 on one side of the cone is above and on the other side beneath the drive pins 33; consequently the pins 33 engage and disengage their slots 24 during each revolution of the cone and member. However a plurality of slots 24 and pins 33 are so spaced that at all times there are some pins in engagement with their slots to impart rotation to the ring 21.

Secured upon the top of the circular wall 25 of the base 2 is an annular flange 35 upwardly from which a retaining wall 36 extends. The top of the circular wall 25 is parallel with the upper face of the ring 21 and, in the present instance, substantially in alignment with the upper face of the circular shelf 22; and the axis of the annular flange 35 and its wall 36 is in alignment with that of the shelf 22 and its ring 21. Secured to the retaining wall 36 is an orienting bar 37 which extends inwardly across the shelf 22 in the direction of rotation of the latter at such height that oriented workpieces A upon the shelf pass beneath the bar as the former rotates, while improperly positioned workpieces are forced back by the bar onto the cone 8. Formed in the retaining wall somewhat past the orienting bar 37, relative to the direction of rotation of the shelf, is a substantially radial opening 38 opposite a portion of the shelf which is higher than the base of the cone 8. Secured upon the wall 36 past the opening 38 is a plow 39 which extends inwardly in the direction opposite to that in which the shelf turns to divert workpieces upon the latter outwardly through the opening 38 onto a chute 40. Moreover the formation of the adjacent side of the chute 40 opposite the opening 38 is such that workpieces discharged from the shelf land on the said chute on edge, so that circular workpieces may roll therealong to a desired destination.

An apron 41 is secured to the circular wall of the base 2 and extends upwardly immediately adjacent the inner side of that portion of the annular member 23 which is higher than the base of the cone 8 to prevent workpieces upon the latter becoming caught partly in the slots 24 and interfering with the rotation of the shelf 22 and the said cone.

Mounted upon the stand 1 is a hopper 45 to contain workpieces for orientation. The hopper, in the present instance, has downwardly and inwardly inclined sides, and a slowly moving conveyor belt 46 extending longitudinally and forming the base. Mounted on the hopper toward opposite extremities are parallel shafts 47 and 48 on which pulleys 49 and 50 respectively, are mounted and around which the belt 46 is arranged. Secured to the underside of the hopper 45 is a motor driven speed reducer unit 51 having a drive sprocket 52. Extending around the latter and around a second sprocket 53 fixed on the shaft 48 is an endless chain 54, so that when the reducer unit is in operation the belt 46 is driven. Secured to the front of the hopper 45 on terminating over the cone 8 is an inclined delivery chute 55 down which workpieces pass from the belt 46 to drop onto the cone. To prevent workpieces travelling one upon another to the chute 55 a vertically adjustable plate 56 is provided on the front of the hopper which may be lowered to any desired position and restrict the height of the opening through which the pieces pass.

Mounted on the flange 35 is a conventional pendulum switch 60 the swinging arm 61 of which is dependingly arranged over the annular shelf 22 between the orienting bar 37 and the plow 39 so that the said arm is swung by workpieces passing on the shelf toward the said plow. The switch may be one in which a delayed action mechanism is provided so that a circuit in which the switch is included remains broken during movement of the arm and for a short time thereafter. Conesquently if a workpiece which is improperly positioned on the shelf is pushed back onto the cone by the orienting bar so that a short interval occurs between the passage of the workpiece which was in front of the improperly positioned one and the one which followed the latter the switch will not immediately function to close the circuit during that interval. In the arrangement shown a lead 62 connects the pendulum switch 60 with the motor of the reducer unit 51, and extending from a source of power (not shown) to the switch and motor are other leads 63 and 64, respectively.

While in the foregoing the preferred embodiment of the invention has been described and shown it is understood that alterations and modifications may be made thereto provided they fall within the scope of the appended claims.

What we claim is:

1. An orienter including a base, a cone mounted for rotation thereon onto which workpieces are adapted to be delivered, an annular shelf around the cone supported for rotation on the base, the axes of the cone and shelf being inclined to one another whereby a portion of the shelf is higher and the opposite portion thereof is lower than the adjacent portions of the base of the cone so that workpieces pass from the cone onto the shelf means for turning the cone and shelf, an annular wall on the base extending upwardly around the shelf and having an opening therethrough, an orienting bar supported on the base and inwardly inclined over the shelf to force improperly positioned workpieces thereon back onto the cone, and a plow supported on the base and extending across the shelf to divert workpieces thereon through said opening.

2. An orienter including a base, a cone on which workpieces are adapted to be deposited mounted for rotation on the base about a vertical axis, an annular shelf around the cone supported for rotation on said base about an axis inclined to that of the cone whereby one portion of the shelf is higher and the opposite portion thereof is lower than the base of the cone so that workpieces are adapted to pass from the cone onto the shelf, means for turning the cone and shelf, an annular wall on the base extending upwardly around the shelf and having an opening therethrough, an orienting bar supported on the base spaced above and extending across the shelf to force improperly positioned workpieces thereon back onto the cone, and a plow supported on the base and extending across the shelf to divert workpieces on said shelf through said opening.

3. An orienter including a base, a cone mounted for rotation thereon, means for turning the cone, an annular shelf around the cone supported for rotation on the base, the axes of the cone and shelf being inclined to one another whereby a portion of the shelf is higher and the opposite portion thereof is lower than the adjacent portions of the base of the cone, coacting means on the cone and shelf for rotating said shelf when the cone is turned, an annular wall on the base extending upwardly around the shelf and having an opening therethrough, an orienting bar supported on the base and extending inwardly in the direction in which the shelf turns over a portion of the shelf which is higher than the adjacent portion of the base of the cone, and a plow supported on the base and extending over the shelf to divert workpieces thereon through the opening.

4. An orienter including a base, a cone mounted for rotation thereon about a vertical axis, means for rotating the cone, an annular shelf around the cone supported for rotation by the base about an axis inclined to that of the cone whereby one portion of the shelf is higher and the opposite portion thereof is lower than the base of the cone, a skirt depending from the cone, an annular member depending from the shelf, coacting means on the skirt and member for turning the shelf when the cone is turned, an apertured wall extending upwardly from the base around the shelf, an orienting bar mounted on the wall and extending over the shelf, said bar being inwardly inclined in the direction in which the shelf turns, and a plow mounted on the wall extending over the shelf to divert workpieces thereon through said aperture.

5. An orienter including a base, a cone mounted for rotation thereon and having a depending skirt, pins extending radially outward from the skirt, a shelf mounted for rotation on the base having a depending annular member, the axes of the shelf and cone being inclined to one another whereby a portion of the shelf is above and the opposite portion thereof is beneath the adjacent portion of the base of the cone, said member having substantially vertical slots formed therein from its underside for engagement by said pins whereby rotation of the cone imparts rotation to the shelf, means for rotating the cone, an annular wall on the base extending upwardly around the shelf and having an opening therethrough, an orienting bar supported on the base and extending inwardly over the shelf in the direction in which the shelf rotates, and a plow supported on the base extending over the shelf to divert workpieces thereon through said opening.

6. The combination in claim 5, including an arcuate apron mounted on the base and extending between the annular member and the lower side of the cone.

7. An orienter including a base, a cone mounted for rotation thereon, means for turning the cone, a ring having an annular shelf thereon, the outer periphery of the ring being substantially V-shaped in cross section, spaced sets of opposed rollers mounted on the base for rotatably supporting said outer periphery, the axes of the ring and cone being inclined to one another, coacting means on the ring and cone for turning said ring when the cone is turned, an annular wall on the base extending upwardly around the shelf and having an opening therethrough, an orienting bar supported on the wall and extending inwardly over the shelf in the direction in which the shelf travels, and a plow supported on the wall extending inwardly over the shelf opposite the opening and in the direction opposite that in which the shelf travels.

8. The combination in claim 1, including a pendulum switch mounted on the base and having a pivoted arm extending over the shelf adapted to be swung by passing workpieces thereon, a chute extending over the cone for feeding workpieces thereonto, and electrically operated means for controlling the passage of the workpieces onto the chute, said electrically operated means and said pendulum switch being in a circuit broken by movement of said swinging arm.

No references cited.